United States Patent
Lipcsei et al.

(10) Patent No.: US 7,656,684 B2
(45) Date of Patent: *Feb. 2, 2010

(54) POWER CONVERTER

(75) Inventors: Laszlo Lipcsei, Campbell, CA (US); Catalin Popovici, San Jose, CA (US)

(73) Assignee: O2Micro International Limited, Georgetown, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 12/111,502

(22) Filed: Apr. 29, 2008

(65) Prior Publication Data

US 2008/0232139 A1    Sep. 25, 2008

Related U.S. Application Data

(63) Continuation of application No. 11/342,489, filed on Jan. 30, 2006, now Pat. No. 7,365,995, which is a continuation of application No. 11/027,411, filed on Dec. 30, 2004, now Pat. No. 7,023,709, which is a continuation-in-part of application No. 10/775,275, filed on Feb. 10, 2004, now Pat. No. 7,304,866.

(51) Int. Cl.
    H02M 3/335    (2006.01)
    H02M 3/24     (2006.01)
    H02M 7/5387   (2007.01)
(52) U.S. Cl. .................... 363/17; 363/98; 363/132
(58) Field of Classification Search .......... 363/16, 363/17, 97, 98, 131, 132
    See application file for complete search history.

(56) References Cited

U.S. PATENT DOCUMENTS 4,953,068 A * 8/1990 Henze ..................... 363/17
5,563,775 A * 10/1996 Kammiller ................ 363/17
6,243,275 B1 * 6/2001 Ferencz ................... 363/17
6,392,902 B1 * 5/2002 Jang et al. ................ 363/17
6,483,724 B1 * 11/2002 Blair et al. ............... 363/17
6,567,285 B2 * 5/2003 Cho et al. ................ 363/132
6,888,728 B2 * 5/2005 Takagi et al. ............. 363/17
7,110,265 B2 * 9/2006 Liu et al. ................. 363/16
7,333,349 B2 * 2/2008 Chang et al. ............. 363/17
7,440,301 B2 * 10/2008 Kirchmeier et al. ....... 363/132
2004/0257837 A1 * 12/2004 Xu et al. ................. 363/21.04

* cited by examiner

*Primary Examiner*—Matthew V Nguyen
(74) *Attorney, Agent, or Firm*—Grossman, Tucker, Perreault & Pfleger, PLLC

(57) ABSTRACT

The present disclosure is directed towards a method for power conversion. The method may include controlling a first rectifier switch coupled to one end of a secondary winding of a transformer via a first control signal. The method may further include controlling a first low side switch via said first control signal, said first low side switch and a first high side switch coupled in series along a first path of a full bridge circuit, a first node located between said first high side switch and said first low side switch. The method may also include controlling a second rectifier switch coupled to an opposite end of said secondary winding via a second control signal. The method may additionally include controlling a second low side switch via said second control signal, said second low side switch and a second high side switch coupled in series along a second path of said full bridge circuit, a second node located between said second high side switch and said second low side switch, wherein said primary winding is coupled between said first node and said second node. Of course additional embodiments are also within the scope of the present disclosure.

14 Claims, 8 Drawing Sheets

POWER CONVERTER

CROSS REFERENCE TO RELATED APPLICATIONS

This application is a continuation of U.S. patent application Ser. No. 11/342,489 filed Jan. 30, 2008, now U.S. Pat. No. 7,365,995, which itself is a continuation of U.S. patent application Ser. No. 11/027,411, filed Dec. 30, 2004, now U.S. Pat. No. 7,023,709, which itself is a continuation-in-part of U.S. patent application Ser. No. 10/775,275, filed Feb. 10, 2004, now U.S. Pat. No. 7,304,866, the complete disclosures of all of which are incorporated herein by reference.

FIELD

This disclosure relates to power converters, and more particularly to DC to DC converters.

BACKGROUND

A DC to DC converter may be used in a variety of electronic devices to convert an input DC voltage to an output DC voltage. One DC to DC converter may have a transformer based full bridge primary and a current doubler rectifier secondary topology. In this instance, a full bridge circuit may be coupled across a primary winding of an isolation transformer and a current doubler rectifier circuit may be coupled across a secondary winding of the isolation transformer. The full bridge circuit may have four switches arranged in known bridge configuration. The current doubler rectifier may have two switches.

In one known arrangement, the four switches of the full bridge circuit may be controlled by four separate control signals and the two switches of the current doubler rectifier circuit may be controlled by an additional two control signals. Thus, six different control signals are required to be provided to each switch in this known arrangement. In addition, the six switches may be responsive to these six associated control signals such that before each power transfer cycle, the secondary winding is shorted, but the primary winding is left open (the four switches of the full bridge are open). This known arrangement therefore requires a relatively larger core size for the transformer since for each cycle on the magnetization curve, the core will almost be brought back to the initial state where the core is not magnetized.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
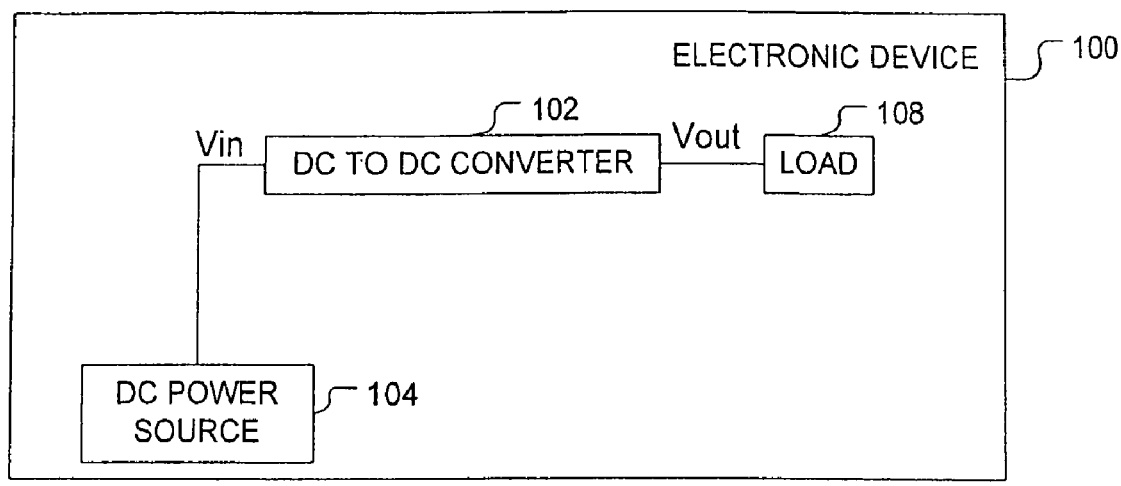
FIG. 1 is a block diagram of an electronic device having a DC to DC converter consistent with an embodiment.

FIG. 1 illustrates an electronic device 100 having a power converter, e.g., a DC to DC converter 102 consistent with an embodiment. The electronic device 100 may be any variety of electronic devices, including, but not limited to, a server computer, a desk top computer, a lap top computer, cell phone, personal digital assistant, etc. The electronic device 100 may receive power from any variety of power sources such as a DC power source 104. The DC power source may be any variety of power sources such as, for example, an AC/DC adapter, a DC "cigarette" type adapter, a battery, or a rechargeable battery. A rechargeable battery may include any type of rechargeable battery such as lithium-ion, nickel-cadmium, nickel-metal hydride batteries, or the like. The DC to DC converter 102 may receive a DC input voltage, Vin, and provide an output DC voltage, Vout, to a load 108. The output voltage, Vout, provided by the DC to DC converter 102 may be higher or lower than the input voltage Vin.

Figure 2:
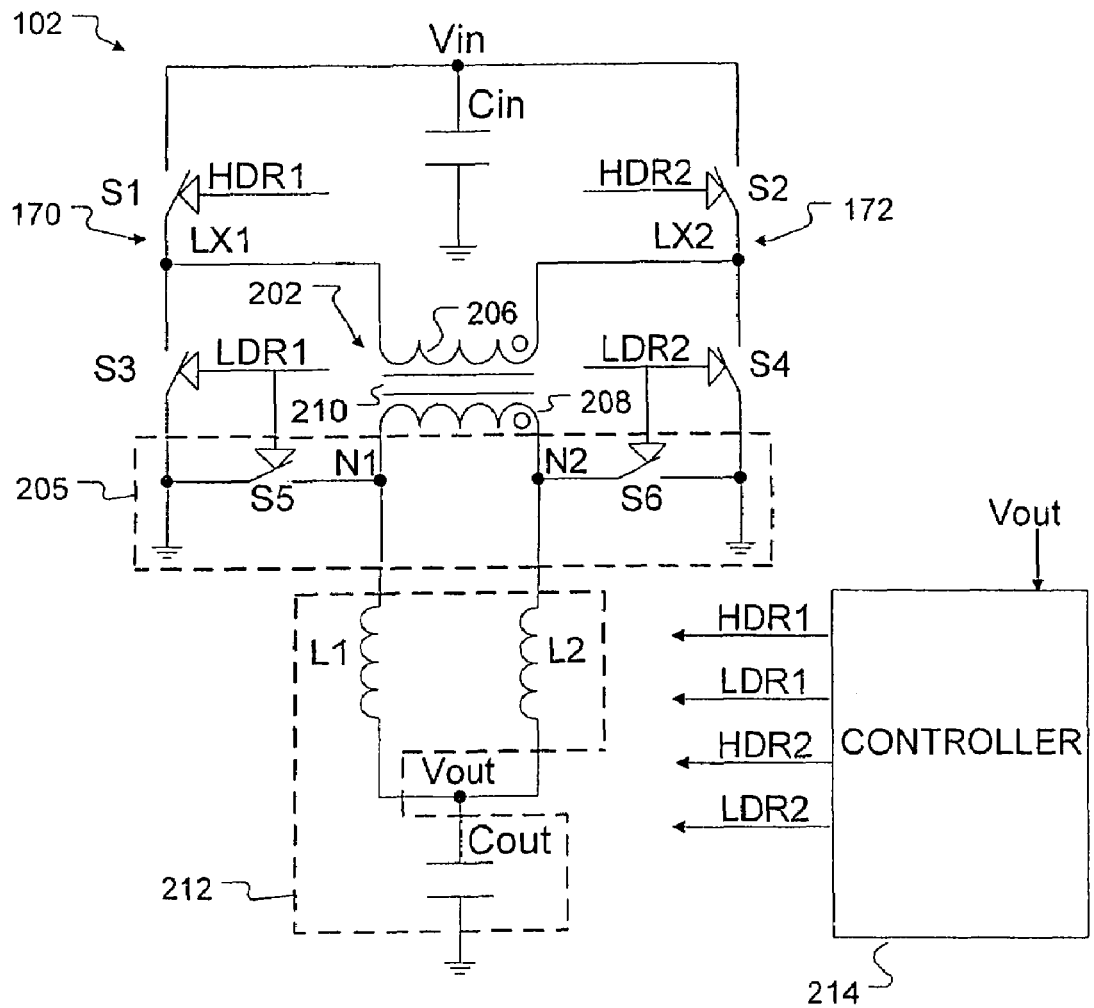
FIG. 2 is a circuit diagram of one embodiment for the DC to DC converter of FIG. 1.

FIG. 2 illustrates a circuit diagram of one embodiment 102a of the DC to DC converter 102 of FIG. 1 in more detail. In general, the DC to DC converter 102a receives an input DC voltage, Vin, and provides a desired output DC voltage, Vout. The DC to DC converter 102a may include a transformer 202, a full bridge circuit, a rectifier circuit 205, and an output filter 212. The transformer 202 may have a primary winding 206, a secondary winding 208 and a core 210. The full bridge circuit may have a pair of paths 170, 172. Path 170 may also have a high side switch S1 and a low side switch S3 coupled in series. Path 170 may have a node LX1 coupled between switches S1 and S3. The high side switch S1 of path 170 may be coupled between an input voltage terminal and node LX1, while the low side switch S3 of path 170 may be coupled between node LX1 and ground. Similarly, path 172 of the full bridge circuit may have a high side switch S2 and a low side switch S4 coupled in series and have a node LX2 coupled between switches S2 and S4. The primary winding 206 of the transformer 202 may be coupled to nodes LX1 and LX2 of the full bridge circuit. The rectifier circuit 205 may be a current doubler rectifier circuit having switches S5, S6 coupled across the secondary winding 208 of the transformer 202. Switch S5 may be coupled between node N1 and ground while switch S6 may be coupled between node N2 and ground. The output filter 212 may include inductors L1, L2 and capacitor Cout.

A controller 214 may provide control signals HDR1, LDR1, HDR2, and LDR2 to the various switches S1, S2, S3, S4, S5, and S6. The switches S1 through S6 may be realized by any variety of transistors including bipolar and field effect transistors. In one embodiment, metal oxide semiconductor field effect transistors (MOSFETs) may be utilized. The controller 214 may also accept a signal from the DC to DC converter 102a representative of the output voltage Vout of the DC to DC converter and make switching decisions based, at least in part, on such signal.

Advantageously, control signal LDR1 may be provided to both the low side switch S3 of path 170 of the full bridge circuit and to switch S5 of the rectifier circuit 205 in order to simultaneously drive switches S3 and S5. In addition, control signal LDR2 may be provided to both the low side switch S4 of path 172 of the full bridge circuit and to switch S6 of the rectifier circuit 205 in order to simultaneously drive switches S4 and S6. As such, only four control signals HDR1, LDR1, HDR2, and LDR2 are necessary to control operation of all six switches S1 through S6.

Figure 3:
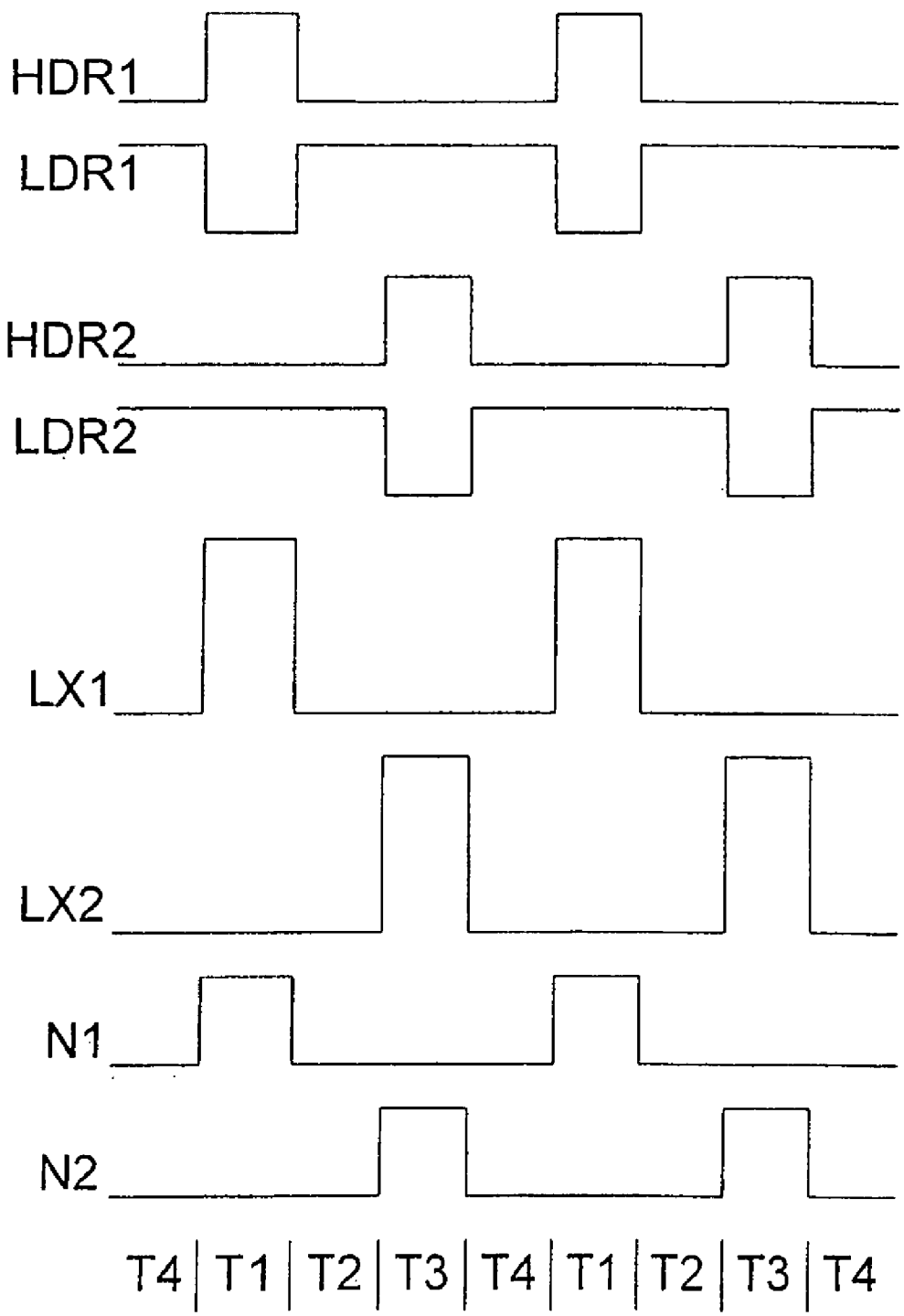
FIG. 3 is a timing diagram for the DC to DC converter of FIG. 2.

FIG. 3 illustrates a timing diagram for the control signals HDR1, LDR1, HDR2, and LDR2 provided to the switches S1 through S6 of the DC to DC converter of FIG. 2 to further detail operation of the DC to DC converter. FIG. 3 also illustrates exemplary voltage levels at various nodes LX1, LX2, N1, and N2 of the DC to DC converter 102a of FIG. 2 during various time intervals T1, T2, T3, and T4. In general, when an associated control signal for an associated switch is "high" the switch is ON and accordingly conducts current. In contrast, when an associated control signal for an associated switch is "low" the switch is OFF and accordingly does not conduct current. Those skilled in the art will also recognize other switch and control signal configurations where alternative switches may be responsive to alternative control signals.

During time interval T1, control signal HDR1 may be high, control signals LDR1 and HDR2 may be low, while control signal LDR2 may be high. In response to such control signals, switch S1 may be ON, switches S3 and S5 may be OFF, switch S2 may be OFF, and switches S4 and S6 may be ON. Therefore during time interval T1, node LX1 may be connected to the input DC voltage Vin through closed switch S1 and node LX2 may be connected to ground through closed switch S4. As such, node LX1 may have a voltage level associated with Vin while node LX2 may have a zero voltage level. Node N1 may have a voltage level associated with the voltage level at node LX1 due to the voltage level induced in the secondary winding 206 because of the current flowing in the primary winding 206. The relative voltage level at node N1 compared to the voltage at node LX1 during time interval T1 depends on the type of transformer 202. For a step down transformer delivering a lower output voltage Vout than input voltage Vin, the voltage level at node N1 during time interval T1 may be less than the voltage level at node LX1 as illustrated in FIG. 3.

Also during time interval T1, node N2, together with the corresponding side of the secondary winding 208, may be connected to ground through closed switch S6. As such, node N2 may have a zero voltage level during time interval T1. Therefore, during time interval T1 power may be transferred during this first power transfer time interval from the input voltage Vin via switch S1 and node LX1 to the primary winding 208, induced on the secondary winding 208 and visible at node N1.

During time interval T2, control signal HDR1 may be low, control signal LDR1 may be high, control signal HDR2 may be low, while control signal LDR2 may be high. In response to such control signals, switch S1 may be OFF, switches S3 and S5 may be ON, switch S2 may be OFF, and switches S4 and S6 may be ON. Advantageously, the primary winding 206 and the secondary winding 208 of the transformer 202 are both shorted during this time interval T2, which may be referred to herein as a reset time interval. As used herein, a "short" means a contract between two points in a circuit having a potential difference. In one embodiment, the primary winding 206 may be shorted by coupling the primary winding to a ground terminal, either directly to a ground terminal as in FIG. 2 or indirectly via a resistor Rsense as in FIG. 5.

In the embodiment of FIG. 2, the primary winding 206 may be shorted since both nodes LX1 and LX2 are coupled to ground via closed switches S3 and S4 (whiles switches S1 and S2 are open). The secondary winding 208 may also be shorted via closed switches S5 and S6. Since both the primary and secondary windings 206, 208 are shorted during this time interval T2, the energy stored in the transformer core 210 may be more fully preserved compared to shorting only the secondary winding 208 and leaving the primary winding 206 open as may be done in one embodiment of the prior art. Hence, a relatively smaller core size may be achieved. In addition, the nodes LX1, LX2, N1, and N2 may all have a zero voltage level during this reset time interval T2 given the state of switches S1 through S6.

Time interval T3 may be a second power transfer time period in which generally the state of switches S1, S4 and switches S2, S3 are alternated to apply opposite polarities of the input DC voltage Vin across the primary winding 206 of the transformer 202. For instance, during time interval T3 control signal HDR1 may be low, control signal LDR1 may be high, control signal HDR2 may be high, while control signal LDR2 may be low. In response to such control signals, switch S1 may be OFF, switches S3 and S5 may be ON, switch S2 may be ON, and switches S4 and S6 may be OFF. As such, node LX2 may have a voltage level associated with Vin while node LX1 may have a zero voltage level. Node N2 may have a voltage level associated with the voltage level at node LX2 due to the voltage level induced in the secondary winding 208 because of the current flowing in the primary winding 206. The relative voltage level at node N2 compared to the voltage at node LX2 during time interval T3 depends on the type of transformer 202. For a step down transformer, the voltage level at node N2 during time interval T3 may be less than the voltage level at node LX2 as illustrated in FIG. 3.

Also during time interval T3, node N1, together with the corresponding side of the secondary winding 208, may be connected to ground through closed switch S5. As such, node N1 may have a zero voltage level during time interval T3. Therefore, during time interval T3 power may be transferred during this second power transfer time interval from the input voltage Vin via switch S2 and node LX2 to the primary winding 206, induced on the secondary winding 208 and visible at node N2.

Finally, time interval T4 may be similar to the earlier detailed time interval T2. That is, control signal HDR1 may be low, control signal LDR1 may be high, control signal HDR2 may be low, while control signal LDR2 may be high. In response to such control signals, switch S1 may be OFF, switches S3 and S5 may be ON, switch S2 may be OFF, and switches S4 and S6 may be ON. Advantageously, the primary winding 206 and the secondary winding 208 of the transformer 202 may both be shorted during this time interval T4 as earlier detailed regarding time interval T2. In addition, the nodes LX1, LX2, N1, and N2 may all have a zero voltage level during this reset time interval T4 given the state of switches S1 through S6.

Figure 4:
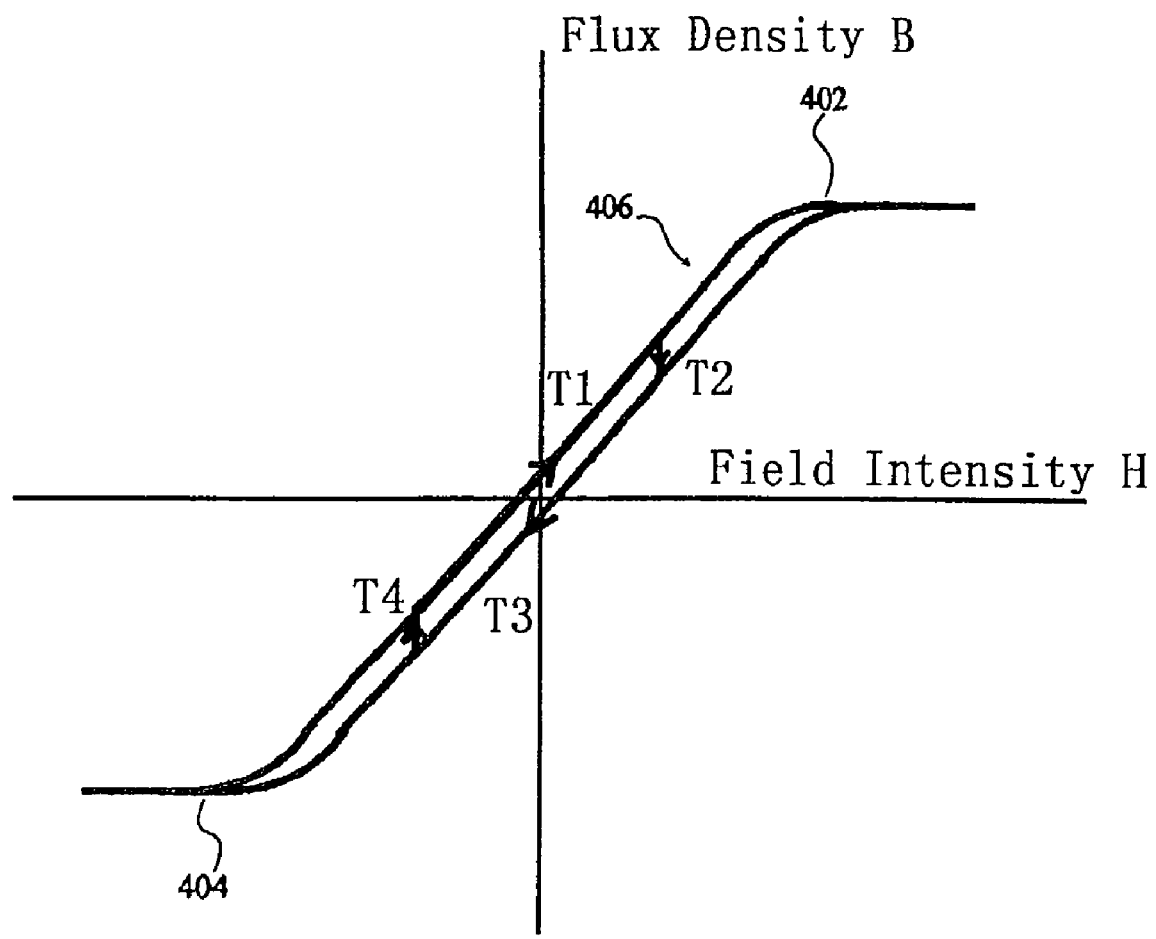
FIG. 4 is a plot of the core magnetization curve for the core of the transformer of FIG. 2.

FIG. 4 is an exemplary plot of the core magnetization curve for the core 210 of the transformer 202 of FIG. 2 plotting flux density (B) versus field intensity (H) for the core 210. The core reaches magnetic saturation at points 402, 404 on the hysteresis loop 406. Advantageously, before each power transfer cycle during times T1 and T3, the core maintains its magnetizing level from the previous cycle. For each cycle on the magnetization curve the core may start from a pre-charged value which may be discharged first (during time intervals T2 and T4) and then charged to the same level but in an opposite direction (during time intervals T1 and T3). In this way, the core is kept far from the saturation points 402, 404 with the operating point of the core 210 closer in proximity to zero on the B-H axis. As such, the physical size of the core 210 may advantageously be smaller than an embodiment in the prior art. In one example, by shorting both the primary and secondary winding the core energy conserved may be about 90% of maximum compared to about 60% of maximum when only the secondary winding is shorted. Therefore, the core size may decrease by about 30% in this example.

In addition to a reduced core size, the controller 214 for the DC to DC converter 102a need only provide four control signals HDR1, LDR1 and HDR2, LDR2. As illustrated in FIG. 3, control signals HDR1 and LDR1 have opposite phases during each time interval T1 through T4, e.g., control signal HDR1 is high when LDR1 is low and vice versa. Control signals HDR2 and LDR2 also have opposite phases during each time interval. In addition, each pair of opposite phase control signals (HDR1/LDR1 and HDR2/LDRD2) may be separated by a certain time interval, e.g., equal to time interval T2 in one embodiment as shown in FIG. 3. Advantageously, a controller 214 to provide such signals HDR1, LDR1 and HDR2, LDR2 may be readily available and inexpensive. For instance, if the switches S1 to S6 are implemented as MOSFETs, a portion of such a controller 214 may be a dual MOSFET driver as is known in the art. For example, such a dual MOSFET driver may provide switch control signals to a buck converter in another application.

The operation of the power converter 102a of FIG. 2 may short both the primary 206 and secondary 208 winding of the transformer 210 during reset time intervals T2 and T4 to preserve core magnetization. The operation of the power converter of FIG. 2 with reference to the timing diagram of FIG. 3 illustrates one of many ways to short the primary 206 and secondary 208 winding during a reset time interval. For example, in another embodiment both high side switches S1 and S2 may short the primary winding by closing and providing a path to another terminal having a voltage level different than the voltage level of the primary winding. This and some other methods of shorting the primary and the secondary winding may not be able to utilize readily available, low cost dual MOSFET drivers if the switches S1 to S6 are MOSFET transistors.

Figure 5:
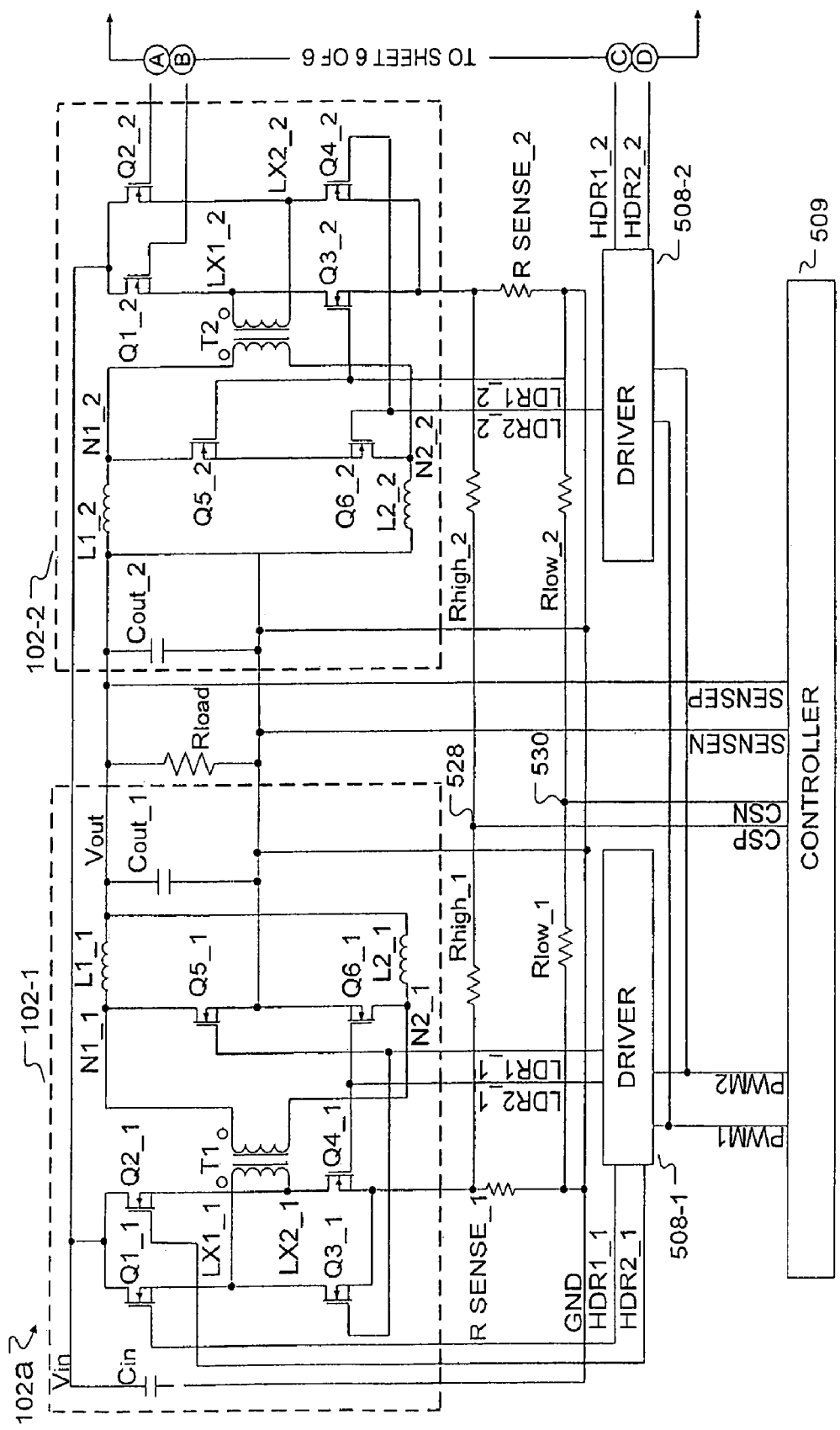
FIG. 5 is a circuit diagram of another embodiment of a DC to DC converter having a plurality of power units coupled in parallel.
Figure 5:
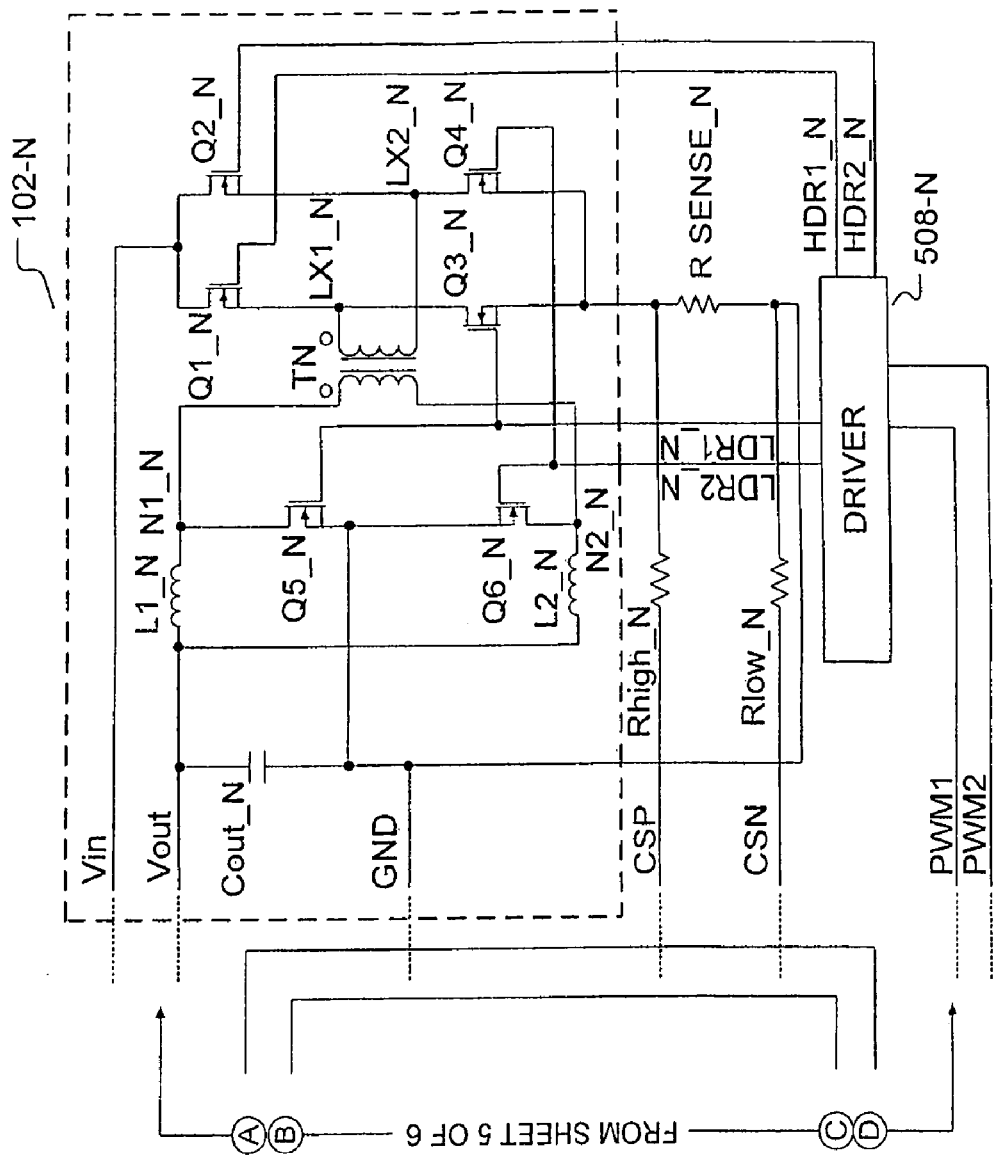

FIG. 5 illustrates another embodiment of a DC to DC converter 102b having a plurality of power units 102-1, 102-2 ... 102-N. Each power unit 102-1, 102-2 ... 102-N may be similar to the DC to DC converter embodiment 102a previously detailed in FIG. 2. Each power unit 102-1, 102-2 ... 102-N may be coupled together in parallel. Each power unit may also have an associated driver 508-1, 508-2 ... 508-N. In one embodiment, the drivers 508-1, 508-2 ... 508-N may be dual MOSFET drivers. Each driver may receive the same pulse width modulated signals PWM1 and PWM2 from controller 509. Signals PWM1 and PWM2 may be generated by controller 509 based on a cycle-by-cycle peak current detection technique. Since the same PWM1 and PWM2 signals are provided to each driver 508-1, 508-2 ... 508-N, there is an inherent balance between power units and N power units can be coupled in parallel without additional circuitry using the topology detailed in FIG. 5. That is, each additional power unit simply needs to couple its associated driver to the PWM1 and PWM2 signal and couple to the other power units in parallel.

Since each driver 508-1, 508-2 ... 508-N receives the same PWM1 and PWM2 signals, matching between each power unit 102-1, 102-2 ... 102-N is as good as the matching of the physical elements of each power unit, e.g., the inductors, transformers, transistors, resistors of each. Since control signals LDR1, LDR2, HDR1, and HDR2 from each driver are provided in response to the same PWM1 and PWM2 signals, the delays between power stages, e.g., the length of various time intervals T2 and T4 may also be matched. This may also prevent current flowing from one power unit's output to another since the conduction periods, e.g., time intervals T1 and T3, are also consistent. As such, the tolerances of the components of each power unit may be involved only as a percentage matching error since the zero load condition may be free of additional offset current between outputs of each power unit.

The current sensing schematic of FIG. 5 may utilize a summing resistive network in a differential topology to cancel any ground potential offsets between each power unit. Each section of the resistive network corresponding to one power unit may utilize a high side balancing resistor (Rhigh_1 ... Rhigh_N) and a low side balancing resistor (Rlow_1 ... Rlow_N). In one embodiment, all the high side balancing resistors (Rhigh_1 ... Rhigh_N) and all the low side balancing resistors (Rlow_1 ... Rlow_N) may be of equal value. The voltage between node 528 (CSP node) and node 530 (CSN node) is the instantaneous average value of the voltages developed across the N sensing resistors (R SENSE_1 ... R SENSE_N) as given by equation (1), where N is the number of power units 102-1, 102-2 ... 102-N.

$$V_{CSP} - V_{CSN} = \frac{V_{RSENSE\_1} + V_{RSENSE\_2} + \ldots + V_{RSENSE\_N}}{N} \quad (1)$$

Advantageously, the transient response speed of the embodiment of FIG. 5 is relatively fast compared to DC to DC converter having a single stage power unit due to the N times lower output equivalent inductance, where N is the number of power units. If all transformers for each power unit are substantially identical, the voltages applied across all the inductors is also equal. In addition, all the inductors are in parallel so the equivalent inductance will be N times lower. The output current ramping capability during load transients will also be N times higher.

Figure 6:
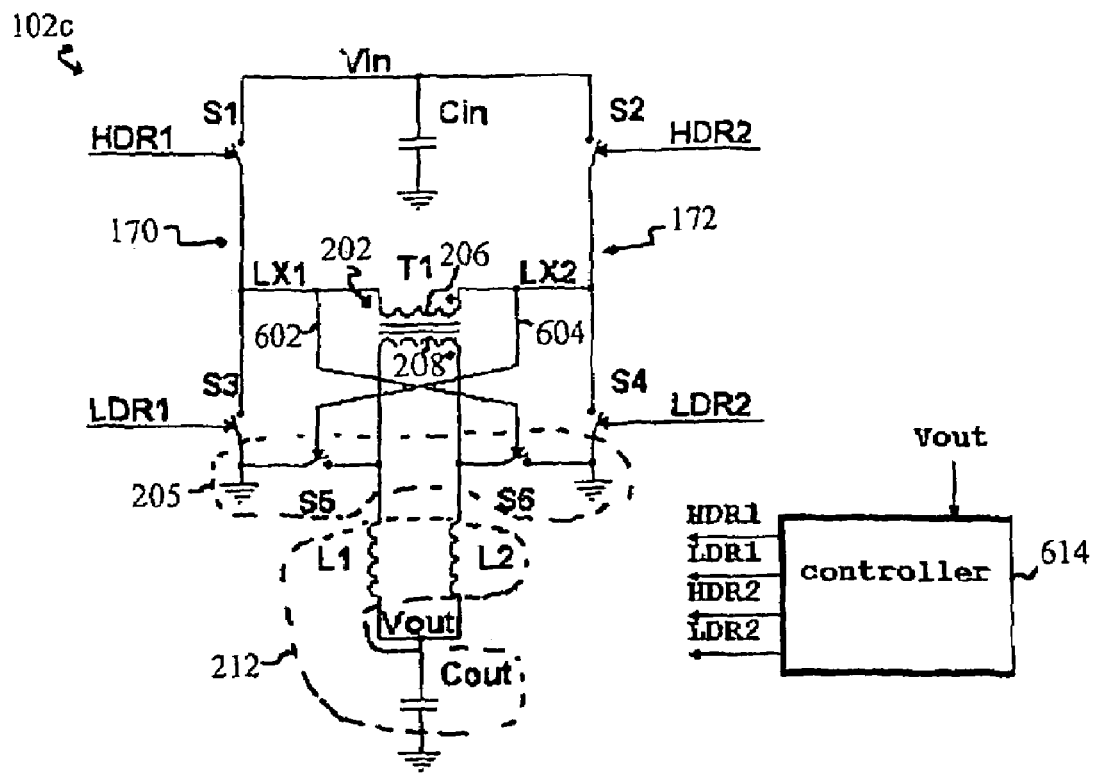
FIG. 6 is a circuit diagram of another embodiment for the DC to DC converter of FIG. 1.

FIG. 6 illustrates a circuit diagram of another embodiment 102c of the DC to DC converter 102 of FIG. 1. Components of the DC to DC converter 102c similar to the components of the DC to DC converter 102a of FIG. 2 are labeled similarly, and hence any repetitive description is omitted herein for clarity. In contrast to the embodiment illustrated in FIG. 2, the HDR1, HDR2, LDR1, and LDR2 control signals from controller 614 may directly drive only bridge switches S1, S2, S3, and S4 respectively. The synchronous rectifier switches S5 and S6 may then be driven directly by rectifier driving signals from nodes LX2 and LX1 respectively. A path 604 from node LX2 to switch S5 and a path 602 from node LX1 to switch S6 may be provided for this purpose.

The switches S1 through S6 may be realized by any variety of transistors including bipolar and field effect transistors. In one embodiment, MOSFETs may be utilized. The controller 614 may also accept a signal from the DC to DC converter 102c representative of the output voltage Vout of the DC to DC converter and make switching decisions based, at least in part, on such signal.

Figure 7:
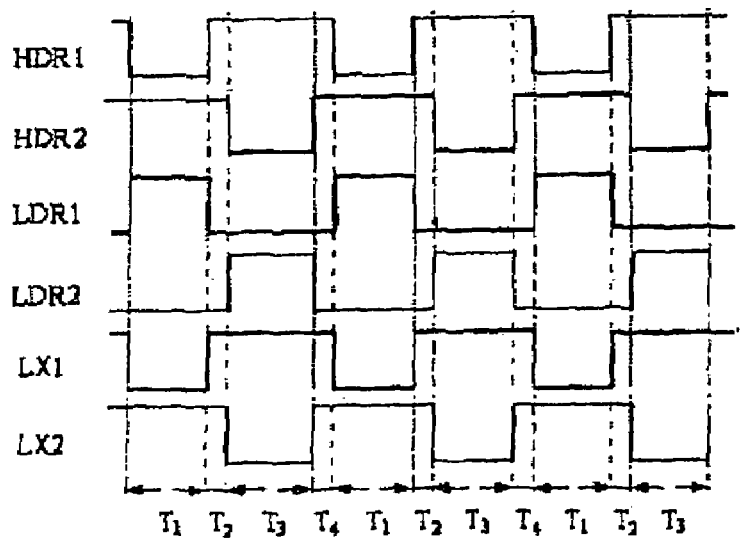
FIG. 7 is a timing diagram for the DC to DC converter of FIG. 6.

FIG. 7 illustrates a timing diagram 700 to further detail operation of the DC to DC converter 102c of FIG. 6. The timing diagram 700 illustrates control signal HDR1 provided to switch S1, control signal HDR2 provided to switch S2, control signal LDR1 provided to switch S3, control signal LDR2 provided to switch S4, and rectifier drive signals provided at nodes LX1 and LX2 to rectifier switches S6 and S5 respectively during various time intervals T1, T2, T3, and T4.

In general, when an associated control signal for an associated switch is "high" the switch is ON and accordingly conducts current. In contrast, when an associated control signal for an associated switch is "low" the switch is OFF and accordingly does not conduct current. Those skilled in the art will also recognize other switch and control signal configurations where alternative switches may be responsive to alternative control signals.

During time interval T1, control signal HDR1 may be low, control signal HDR2 may be high, control signal LDR1 may be high, and control signal LDR2 may be low. In response to such control signals, switch S1 may be OFF, switches S2 and S3 may be ON, and switch S4 may be OFF. In addition, switch S5 may be ON since the rectifier drive signal provided by node LX2 to switch S5 via path 604 may also be high during this time interval T1 (since switch S2 is closed). Switch S6 may be OFF since the rectifier drive signal provided by node LX1 to switch S6 via path 602 may be low (since switch S1 is open). Therefore during time interval T1, current may flow from node LX2 to node LX1 through the primary winding 206 of the transformer 202.

During time interval T2, e.g., a reset time interval, control signal HDR1 may be high, control signal HDR2 may be high, control signal LDR1 may be low, and control signal LDR2 may be low. In response to such control signals, switches S1 and S2 may be ON, and switches S3 and S4 may be OFF. In addition, switches S5 and S6 may be ON since the rectifier drive signals provided by nodes LX2 and node LX1 to switches S5 and S6 via paths 604 and 602 may also be high during this time interval T2. Therefore, the primary winding 206 may be shorted to Vin via closed switches S1 and S2, and the secondary winding 208 may be shorted to ground via closed switches S5 and S6.

During time interval T3, control signal HDR1 may be high, control signal HDR2 may be low, control signal LDR1 may be low, and control signal LDR2 may be high. In response to such control signals, switch S1 may be ON, switches S2 and S3 may be OFF, and switch S4 may be ON. In addition, switch S5 may be ON since the rectifier drive signal at node LX2 may be low and switch S6 may be ON since the rectifier drive signal at node LX1 may be high. Therefore during time interval T3, current may flow from node LX1 to node LX2 through the primary winding 206 of the transformer 202.

During time interval T4 (similarly to time interval T2), control signal HDR1 may be high, control signal HDR2 may be high, control signal LDR1 may be low, and control signal LDR2 may be low. In response to such control signals, switches S1 and S2 may be ON, and switches S3 and S4 may be OFF. In addition, switches S5 and S6 may be ON since the rectifier drive signals provided by nodes LX2 and node LX1 to switches S5 and S6 via paths 604 and 602 may also be high during this time interval T2. Therefore, the primary winding 206 may be shorted to Vin via closed switches S1 and S2, and the secondary winding 208 may be shorted to ground via closed switches S5 and S6.

Compared to the timing diagram of FIG. 3, the HDR1, HDR2, LDR1, and LDR2 control signals are inverted to achieve the driving signals from nodes LX1 and LX2 for switches S6 and S5 having proper phase duration and overlap.

Figure 8:
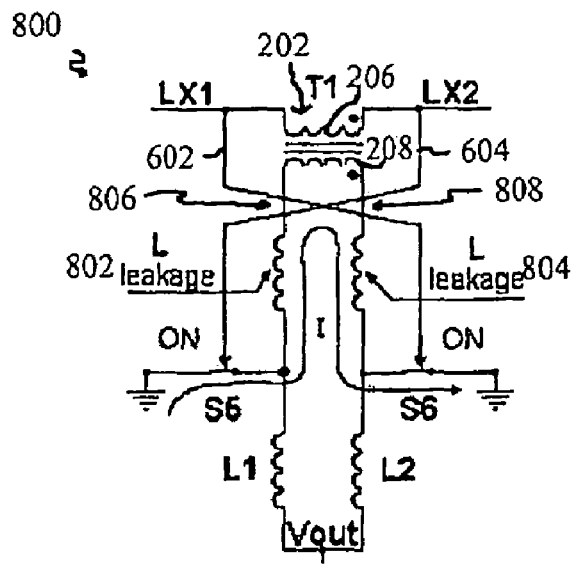
FIG. 8 is an equivalent circuit diagram of the embodiment of FIG. 6 illustrating parasitic leakage inductance in series with the secondary winding of the transformer.

Turning to FIG. 8, an equivalent circuit diagram 800 of the DC to DC converter 102c of FIG. 6 is illustrated. Leakage inductance 802 on path 806 and leakage inductance 804 on path 808 are in series with the secondary winding 208 of the transformer 202. Such leakage inductance 802, 804 in one embodiment may range from 20 nano-henrys (nH) to 40 nH for planar transformers. Advantageously, such parasitic leakage inductance 802 and 804 may protect the synchronous rectifier switches S5 and S6 from overlapping their conduction periods with primary conduction intervals. Such switching moments may occur at the end of periods T2 and T4.

Figure 9:
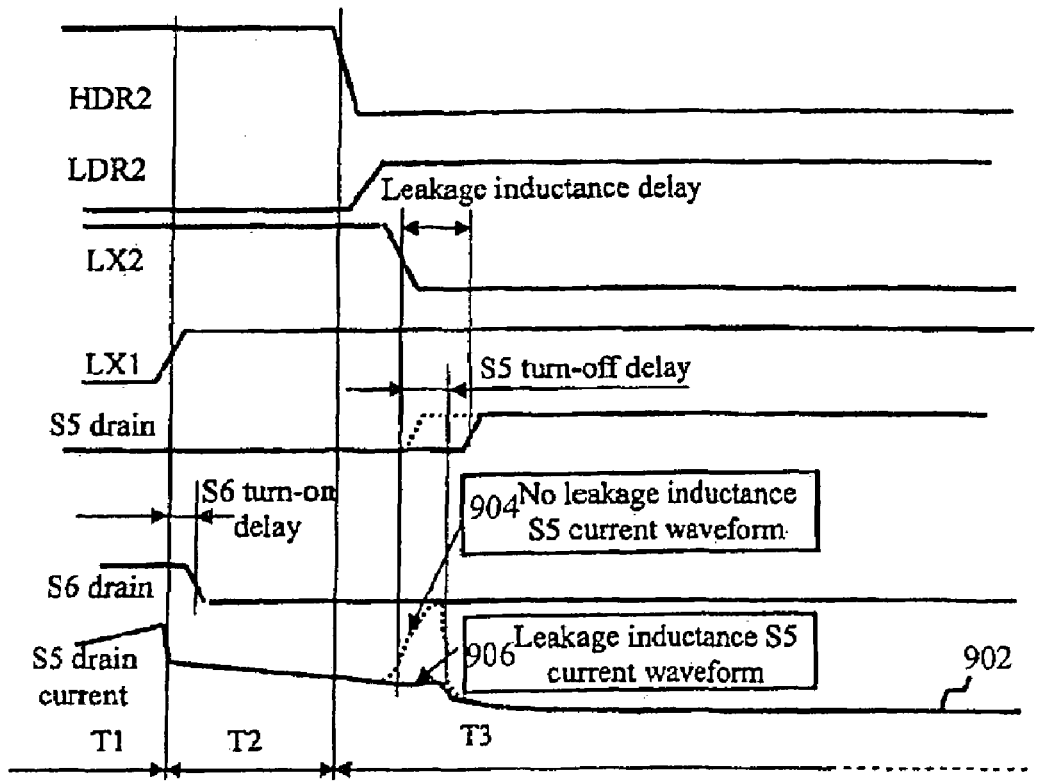
FIG. 9 is a plot of various switching waveforms for the equivalent circuit diagram of FIG. 8.

FIG. 9 illustrates plots of various switching waveforms for the equivalent circuit diagram of FIG. 8 to illustrate the affects of the leakage inductance 802 and 804 in series with the secondary winding 208 of the transformer 202 during the transition from time period T2 to T3. During time T2, switch S2 is ON, switch S4 is OFF, switch S5 is ON and switch S6 is ON in response to signals HDR2, LDR2, and rectifier drive signals from nodes LX2 and LX1. During this T2 time interval, switches S3 and S4 are OFF. Therefore, the primary winding 206 may be shorted to Vin via closed switches S1 and S2 and the secondary winding 208 may be shorted to ground via closed switches S5 and S6.

During the transition from time period T2 to time period T3, switch S2 is switching OFF in response to the HDR2 signal. After switch S2 turns OFF, the voltage at node LX2 may go from Vin to ground. Switch S5 will then eventually turn OFF in response to the rectifier drive signal at node LX2 provided to switch S5 via path 604. Due to the leakage inductance 802, 804, an associated time delay (S5 turn-off delay) will lapse before switch S5 turns OFF in this instance. A similar transition (not illustrated) may occur from time period T4 to T1 for switch S6.

Turning back to the transition between times T2 and T3 and assuming switch S5 is implemented as a MOSFET, plot 902 illustrates the drain current of switch S5. A portion 904 of the plot 902 illustrates how the current would ramp up if there were no leakage inductance 802, 804. Another portion 906 of the plot 902 illustrates how the leakage inductance 802, 804 limits the current slew rate through switch S5 during that time interval between the turning OFF of switch S2 and the turning OFF of switch S5 (during transition between time period T2 and T3). Similarly, the leakage inductance may limit the current slew rate through switch S6 during that time interval between the turning OFF of switch S1 and the turning OFF of switch S6 (during transition between time period T4 and T1.)

For an ideal transformer 202, once node LX2 is switched to ground in response to opening of switch S2, and the other node LX1 is at Vin in response to closed switch S1, the voltage across the secondary winding 208 would rise to Vin/n, where Vin is the input voltage, and n is the turn ratio of the transformer 202. At the particular moment between time periods T2 and T3 when switch S2 has opened, but switch S5 has not opened yet, the secondary winding 208 is still shorted to ground via closed switches S5 and S6. This short condition terminates once switch S5 is finally turned OFF. Even if the switch S5 turn off delay is only on the order of 10 to 20 nanoseconds(ns), the current pulse may ramp up considerably (portion 904 of plot 902) and generate significant power losses.

The total leakage inductance (sum of leakage inductance 802 and 804) may advantageously limit the current slew rate through switches S5 and S6 during the time period between the opening on one of the high side switches S1 or S2 and before the opening of the associated rectifier switches S6 or S5. This slew rate may be limited as detailed in equation (2) given by:

$$\frac{dI}{dt} = \frac{Vin}{n} \cdot \frac{1}{2L_{leakage}} \quad (2)$$

where Vin is the input voltage, n is the turn ratio of the transformer 202, $L_{leakage}$ is the parasitic leakage inductance 802, 804 in series with the secondary winding 208 of the transformer 202. In one example, if Vin=12V, n=3 and $L_{leakage}$=10 nH, then dI/dt=200 A/µs. For a turn-off delay of 10 ns, the current ramps only 2 A, e.g., see portion 906 of plot 902. Hence, the resulting power losses may be negligible.

In one embodiment, there is thus provided a power converter comprising a transformer having a primary winding and a secondary winding, a first high side switch and a first low side switch coupled in series along a first path of a full bridge circuit, a first node between the first high side switch and the first low side switch. The power converter may also comprise a second high side switch and a second low side switch coupled in series along a second path of the full bridge circuit, a second node between the second high side switch and the second low side switch, wherein the primary winding is coupled between the first node and the second node, a first rectifier switch coupled to one end of the secondary winding, and a second rectifier switch coupled to an opposite end of the secondary winding. The power converter may further comprise a first path capable of providing a first rectifier drive signal from the first node to the second rectifier switch, and a second path capable of providing a second rectifier drive signal from the second node to the first rectifier switch. In another embodiment, there is provided an electronic device having such a power converter.

In yet another embodiment there is provided a method. The method may comprise: providing a first control signal to control a state of a first high side switch coupled to a first path of a full bridge circuit; providing a second control signal to control a state of a second high side switch coupled to a second path of the full bridge circuit, the full bridge circuit coupled across a primary winding of a transformer; providing a third control signal to a first low side switch coupled to the first path of the full bridge circuit; providing a fourth control signal to a second low side switch coupled to the second path of the full bridge circuit, a first node being between the first high side switch and the first low side switch, and a second node being between the second high side switch and the second low side switch; providing a first rectifier drive signal from the second node to drive a first rectifier switch coupled to one end of a secondary winding of the transformer; and providing a second rectifier drive signal from the first node to drive a second rectifier switch coupled to an opposite end of the secondary winding.

Advantageously, in these embodiments, the controller 614 may provide only four control signals (HDR1, HDR2, LDR1, LDR2) to directly drive the four bridge switches (switches S1, S2, S3, S4) while the rectifier switches (switches S5 and S6) may be driven by rectifier drive signals provided by nodes LX2 and LX1, e.g., via respective paths 604 and 602. Accordingly, the controller 614 may emanate only a modest amount of heat. In addition, the switching of the low side bridge switches (S3 and S4) may occur rapidly due to a relatively low control electrode charge seen by the low side switches. Under these circumstances, a moderately powerful and reasonably priced controller may be utilized.

Furthermore, the synchronous switches S5 and S6 may now be driven at a voltage level commensurate with the input voltage Vin. In one instance, this may be as much as 12 volts. Driving the switches S5 and S6 at such a higher voltage level may improve the switching performance of such switches S5 and S6. For instance, the switching time may decrease and the ON resistance of the switches S5 and S6 may be decreased compared to driving the switches at a lower voltage level. Both switching time and ON resistance are beneficial for improving the efficiency of the power converter. This is particularly so at higher load current levels.

Furthermore, the parasitic leakage inductance of the transformer may serve to limit a current slew rate through rectifier switches S5 and S6 (after time periods T2 and T4 respectively) after opening of the high side switches (S1 and S2) and before an associated opening of one of the rectifier switches S5 and S6. As such, any excessive current spikes and associated power losses may be avoided.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus comprising:
a controller configured to provide a first control signal to a first rectifier switch coupled to one end of a secondary winding of a transformer, said controller further configured to provide said first control signal to a first low side switch, said first low side switch and a first high side switch coupled in series along a first path of a full bridge circuit, a first node located between said first high side switch and said first low side switch, said controller further configured to provide a second control signal to a second rectifier switch coupled to an opposite end of said secondary winding, said controller further configured to provide said second control signal to a second low side switch, said second low side switch and a second high side switch coupled in series along a second path of said full bridge circuit, a second node located between said second high side switch and said second low side switch, wherein said primary winding is coupled between said first node and said second node.

2. The apparatus of claim 1, wherein said first and second high side switches are configured to close during a first reset time interval to short said primary winding to an input voltage of said power converter.

3. The apparatus of claim 2, wherein said first and second low side switches are configured to open and said first and second rectifier switch are configured to close during said first reset time interval to short said secondary winding to ground during said first reset time interval.

4. The apparatus of claim 1, wherein said first high side switch is responsive to a third control signal, said second high side switch is responsive to a fourth control signal.

5. The apparatus of claim 1, wherein a current slew rate through said first and second rectifier switches after opening of said first and second high side switches and before an associated opening of said second and first rectifier switches is:

$$\frac{dI}{dt} = \frac{Vin}{n} \cdot \frac{1}{2L_{leakage}}$$

where Vin is an input voltage of said power convener, n is a turn ratio of said transformer, and $L_{leakage}$ is a parasitic leakage inductance of said transformer in series with said secondary winding.

6. An electronic device comprising:
a power converter configured to accept an input voltage and generate an output voltage, said power convener comprising:
a controller configured to provide a first control signal to a first rectifier switch coupled to one end of a secondary winding of a transformer, said controller further configured to provide said first control signal to a first low side switch, said first low side switch and a first high side switch coupled in series along a first path of a full bridge circuit, a first node located between said first high side switch and said first low side switch, said controller further configured to provide a second control signal to a second rectifier switch coupled to an opposite end of said secondary winding, said controller further configured to provide said second control signal to a second low side switch, said second low side switch and a second high side switch coupled in series along a second path of said full bridge circuit, a second node located between said second high side switch and said second low side switch, wherein said primary winding is coupled between said first node and said second node.

7. The electronic device of claim 6, wherein said first and second high side switches are configured to close during a first reset time interval to short said primary winding to said input voltage of said power converter.

8. The electronic device of claim 7, wherein said first and second low side switches are configured to open and said first and second rectifier switch are configured to close during said first reset time interval to short said secondary winding to ground during said first reset time interval.

9. The electronic device of claim 6, wherein said first high side switch is responsive to a third control signal, said second high side switch is responsive to a fourth control signal.

10. The electronic device of claim 6, wherein a current slew rate through said first and second rectifier switches after opening of said first and second high side switches and before an associated opening of said second and first rectifier switches is:

$$\frac{dI}{dt} = \frac{Vin}{n} \cdot \frac{1}{2L_{leakage}}$$

where Vin is an input voltage of said power converter, n is a turn ratio of said transformer, and $L_{leakage}$ is a parasitic leakage inductance of said transformer in series with said secondary winding.

11. A method for converting power comprising:
controlling a first rectifier switch coupled to one end of a secondary winding of a transformer via a first control signal;
controlling a first low side switch via said first control signal, said first low side switch and a first high side switch coupled in series along a first path of a full bridge circuit, a first node located between said first high side switch and said first low side switch;
controlling a second rectifier switch coupled to an opposite end of said secondary winding via a second control signal; and
controlling a second low side switch via said second control signal, said second low side switch and a second high side switch coupled in series along a second path of said full bridge circuit, a second node located between said second high side switch and said second low side switch, wherein said primary winding is coupled between said first node and said second node.

12. The method of claim 11, further comprising closing said first and second high side switch during a first reset time interval to short said primary winding to an input voltage of said power converter.

13. The method of claim 12, further comprising opening said first and second low side switch and closing said first and second rectifier switch during said first reset time interval to short said secondary winding to ground during said first reset time interval.

14. The method of claim 11, further comprising limiting a current slew rate through said first and second rectifier switches after opening of said first and second high side switches and before an associated opening of said second and first rectifier switches to:

$$\frac{dI}{dt} = \frac{Vin}{n} \cdot \frac{1}{2L_{leakage}}$$

where Vin is an input voltage of said power converter, n is a turn ratio of said transformer, and $L_{leakage}$ is a parasitic leakage inductance of said transformer in series with a secondary winding of said transformer.

* * * * *